(12) United States Patent
Karam et al.

(10) Patent No.: US 11,149,635 B1
(45) Date of Patent: Oct. 19, 2021

(54) CLOSED COMPRESSED GAS POWER AND THERMAL MANAGEMENT SYSTEM

(71) Applicant: Rolls-Royce North American Technologies Inc., Indianapolis, IN (US)

(72) Inventors: Michael Karam, Plainfield, IN (US); Kaare Erickson, Fishers, IN (US); Robert Duge, Carmel, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 0 days.

(21) Appl. No.: 16/881,969

(22) Filed: May 22, 2020

(51) Int. Cl.
| | | |
|---|---|---|
| *F02C 3/30* | (2006.01) | |
| *F02C 6/00* | (2006.01) | |
| *F02C 3/04* | (2006.01) | |
| *F02C 7/16* | (2006.01) | |
| *F02C 3/28* | (2006.01) | |

(52) U.S. Cl.
CPC .............. *F02C 3/30* (2013.01); *F02C 3/04* (2013.01); *F02C 3/28* (2013.01); *F02C 6/00* (2013.01); *F02C 7/16* (2013.01); F05D 2220/32 (2013.01); F05D 2220/76 (2013.01); F05D 2240/35 (2013.01)

(58) Field of Classification Search
CPC ...... F02C 3/30; F02C 3/04; F02C 3/28; F02C 6/00; F02C 7/16; F05D 2220/32; F05D 2220/76; F05D 2240/35
See application file for complete search history.

(56) References Cited

U.S. PATENT DOCUMENTS

| | | | |
|---|---|---|---|
| 6,326,703 B1 * | 12/2001 | Clark | ........................ F02C 6/00 290/52 |
| 7,416,137 B2 | 8/2008 | Hagen et al. | |
| 9,404,394 B2 | 8/2016 | Simpkin | |
| 10,208,665 B2 | 2/2019 | Simpson | |
| 2004/0013923 A1 | 1/2004 | Molter et al. | |
| 2011/0219773 A1 * | 9/2011 | Gerrish | ..................... F02C 3/20 60/734 |
| 2014/0123648 A1 | 5/2014 | Henss et al. | |
| 2015/0226119 A1 * | 8/2015 | Tanimura | .................. F02C 6/10 60/39.12 |
| 2019/0264582 A1 * | 8/2019 | Hinders | ............... H02K 7/1823 |

FOREIGN PATENT DOCUMENTS

FR          2 977 089         12/2012

* cited by examiner

*Primary Examiner* — Steven M Sutherland
(74) *Attorney, Agent, or Firm* — Crowell & Moring

(57) ABSTRACT

System and methods are provided that use a recharge device to resupply a reservoir and tank with fluids used to power a turbine, which in turn powers a generator, wherein one of the resupplied fluids is used to cool a load that is powered by the generator.

19 Claims, 7 Drawing Sheets

US 11,149,635 B1

CLOSED COMPRESSED GAS POWER AND THERMAL MANAGEMENT SYSTEM

TECHNICAL FIELD

This disclosure relates to power systems and, in particular, to integrated power and thermal management systems.

BACKGROUND

Present integrated power and thermal management systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
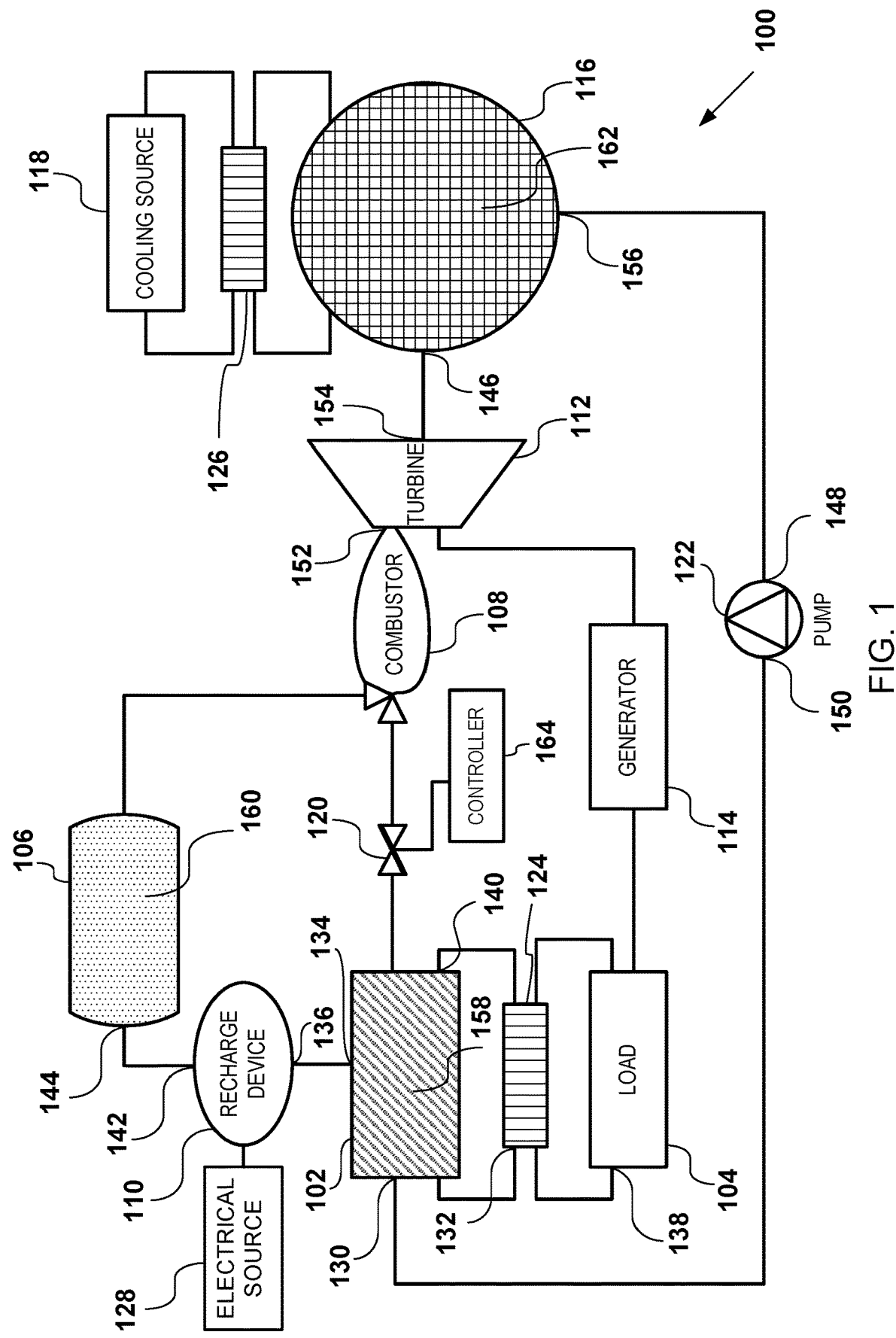
FIG. 1 is a schematic diagram of an example of a closed integrated power and thermal management system.

System and methods of operation for a power and thermal management system are described herein. In some examples, the system may include a reservoir configured to store a coolant, such as water. The system may include a heat exchanger in thermal communication with the reservoir, wherein the heat exchanger is configured to transfer heat from a load to the coolant. The system may include a tank configured to store a reactant, such as hydrogen or oxygen, and a combustor in fluid communication with the reservoir and the tank. The combustor may be configured to combust a mixture of the coolant and the reactant, or combust the reactant in the presence of the coolant supplied by the reservoir The system may include a turbine configured to be driven by a flow of combustion products, such as steam, from the combustor. An electric generator may be configured to be mechanically powered by the turbine, and the generator may be configured to electrically power the load. The system may include a capture plenum configured to collect the combustion products from the turbine. For example, water may collect at the bottom of the capture plenum. The capture plenum may be in fluid communication with the reservoir, wherein the capture plenum is configured to resupply the reservoir from the combustion products. The system may include a recharge device, such as an electrolysis machine, in fluid communication with the reservoir. The recharge device may be configured to decompose the coolant in the reservoir and recharge the tank from the decomposed coolant. For example, the electrolysis machine may decompose water into hydrogen and oxygen.

One interesting feature of the systems and methods described below may be that the system recharges and/or recycles the reactant and the coolant used to supply the combustor and cool the load. The recycled reactant and coolant may refill the reservoir and tank so that the system in some examples may not require external sources of fuel, or may only require minimal external fuel at distant intervals. This may allow the system to be self-sustaining and require little to no maintenance or up-keep in order to continue running. The system may be able to operate for relatively long periods of time without relying on external sources.

Alternatively, or in addition, an interesting feature of the systems and methods described below may be that the system slowly trickle recharges the reactant and/or coolant, and therefore does not require high power sources to recharge the tank and reservoir. The system may recharge the tank and reservoir using lower power sources, for example, solar panels.

Alternatively, or in addition, an interesting feature of the systems and methods described below may be that the system, in some examples, is required to power and cool the load for a relatively short intervals of time with relatively large intervals of inactivity in between. The system may use the relatively large intervals of rest time to recharge the coolant and reactant between the short intervals of powering the load.

FIG. 1 is a schematic diagram of an example of a closed integrated power and thermal management system 100. The system 100 in the example shown includes a reservoir 102, a first heat exchanger 124, a recharge device 110, a tank 106, a pressure regulator 120, a combustor 108, a turbine 112, a generator 114, a load 104, a capture plenum 116, a cooling source 118, a second heat exchanger 126, and a pump 122.

The system 100 illustrated in FIG. 1 may be a closed integrated power and thermal management system (CIPTMS). A CIPTMS may be considered "integrated" because electricity generated by the CIPTMS, for example, by the generator 114, may power one or more devices that are also cooled and/or heated by the CIPTMS. Alternatively or in addition, the thermal management system may cool and/or heat components of the power management/generation system, such as power electronics (not shown), the generator 114, or any other component of the power management/generation system. The CIPTMS may be considered "closed" because one or more of the fluids fed to the combustor 108 may be recirculated by the CIPTMS. For example, the fluids supplied from the reservoir 102 and/or the tank 106 to the combustor 108 may be captured in the capture plenum 116 and recirculated by the pump 122 and the recharge device 110. The tank 106 and/or the reservoir 102 may be resupplied from the recirculated fluids. Alternatively or in addition, the CIPTMS may be considered "closed" because the system 100 may continue to operate without receiving external sources of fuel and/or coolant. Alternatively, the system 100 may not be a closed system.

The reservoir 102 may include any container or vessel that holds or contains a coolant 158. The reservoir 102 may be filled, partially filled, and/or refillable with the coolant 158 by the system 100, via, for example, an inlet 130 of the reservoir 102. In one example, the reservoir 102 may be a tank and the inlet 130 may comprise a tank valve, wherein the coolant 158 is resupplied to the reservoir 102 via the tank valve. The reservoir 102 may be configured to contain a liquid, a gas, or a mixture thereof.

The coolant 158 contained in the reservoir 102 may be a gas, a liquid, or any fluid suitable for cooling the load 104. The coolant 158 may be compressed gas in the reservoir 102. The coolant 158 may be a liquid as it enters the reservoir 102. The first heat exchanger 124 may heat the coolant 158 and the coolant 158 may transform into a gas. In one example, the coolant 158 may be water that is heated and transformed to steam. Other examples of the coolant 158 may include ammonia, propane, and/or commercial refrigerants, for example, R-134a. Alternatively or additionally, the coolant 158 may be a fluid that is part of an adsorption cycle, for example, alcohol. Alternatively or additionally, the coolant 158 may be ammonia or another fluid that is part of an ammonia adsorption cycle. In some examples, the coolant 158 may be a mixture of fluids, for example, propane and water. The coolant 158 may be combustible and/or flammable. Alternatively, the coolant 158 may not be combustible.

The reservoir 102 may be in thermal communication with an inlet 132 of the first heat exchanger 124. The first heat exchanger 124 may be configured to transfer heat from the load 104 to the reservoir 102. The first heat exchanger 124 may transfer heat from the load 104 to the reservoir 102 in order to cool the load 104 and keep a temperature of the load 104 below a threshold maximum temperature. The first heat exchanger 124 may be any device configured to transfer heat between the coolant 158 and a working fluid of the load 104. The working fluid of the load 104 and the coolant 158 of the reservoir 102 may the same fluid or different fluids. The first heat exchanger 124 may keep the coolant 158 and the working fluid separate, wherein each fluid flows through a respective pipe without intermixing, or the first heat exchanger 124 may intermix the coolant 158 and the working fluid. Examples of the first heat exchanger 124 may include an air-to-fluid heat exchanger, a shell and tube heat exchanger, a plate heat exchanger, a plate and shell heat exchanger, a plate fin heat exchanger, a microchannel heat exchanger, a micro heat exchanger, a micro-scale heat exchanger, a microstructured heat exchanger, a direct contact heat exchanger, or any other type of heat exchanger.

The load 104 may include any electrically powered device or combination of devices, which are not part of the system 100, and which may benefit from cooling and/or heating. Examples of the load 104 may include solid state electronics, a light-emitting diode (LED), an analog circuit, a digital circuit, a computer, a server, a server farm, a data center, a circuit that imposes a hotel load such as vehicle electronics, a circuit that imposes a primary load, a component of an aircraft, avionics, a directed-energy weapon, a laser, a plasma weapon, a railgun, a microwave generator, a pulse-powered device, a satellite uplink, an electrically powered machine, an electric motor, and any other electronic device that may benefit from heating and/or cooling. Examples of the directed-energy weapon may include a microwave weapon, a laser weapon, a pulsed energy projectile, a dazzler, a particle-beam weapon, a plasma weapon, and a sonic weapon.

The reservoir 102 may be in fluid communication with the recharge device 110. The recharge device 110 may be any device or combination of devices that is able to decompose or break down the coolant 158 from the reservoir 102 into one or more reactants, such as the reactant 160 stored in the tank 106. The recharge device 110 may be electrically powered in order to drive a chemical reaction that breaks down the coolant 158. The recharge device 110 may be powered by an electrical source 128. The electrical source 128 may be any source of electrical energy. For example, the electrical source 128 may be a battery or a solar panel, which transforms solar power into electrical energy.

The recharge device 110 may be any device or combination of devices configured to decompose or convert one or more fluids into one or more reactants, such as the reactant 160 stored in the tank 106. For example, the recharge device 110 may be or include an electrolysis machine. Alternatively or additionally, the recharge device 110 may include a catalyst. The catalyst may include any substance that produces and/or increases the rate a chemical reaction of the coolant 158. In one example where the coolant 158 is ammonia, the recharge device 110 may include hydrogen peroxide as the catalyst to drive a chemical reaction of the ammonia. Alternatively or additionally, the catalyst may be, for example, a metal, for example platinum. The recharge device 110 may be included in an adsorption cycle, for example the recharge device 110 may be configured to mechanically or chemically drive the adsorption cycle. The recharge device 110 may be a separate component from the reservoir, wherein an outlet 134 of the reservoir 102 is in fluid communication with an inlet 136 of the recharge device. Alternatively, the recharge device 110 may be integrated within the reservoir 102.

The reactant 160 may be a fluid, a gas, or a mixture thereof. The reactant 160 may result from the decomposition of the coolant 158. For example, the reactant may be a product of a chemical reaction of the coolant 158. The reactant 160 may be combustible and/or flammable. In one example where the coolant 158 is water, the reactant 160 may be hydrogen and/or oxygen. Other examples of the reactants 160 may include hydrazine, hydrogen peroxide, alcohol, and/or ammonia. For example, where the coolant 158 includes ammonia, the reactant 160 may be hydrazine. Alternatively or additionally, where the recharge device 110 includes a catalyst, the reactant 160 may be ammonia.

The tank 106 may store the reactant 160 produced by the recharge device 110 from the coolant 158. The tank 106 may be any vessel configured to hold or contain a fluid. The fluid in the tank 106 may be a liquid, a gas, or a mixture thereof. The tank 106 may be pressurized, and the fluid inside of the tank 106 may be compressed. The tank 106 may be in fluid communication with the recharge device 110. The tank 106 and the reservoir 102 may be in fluid communication with the combustor 108.

The pressure regulator 120 may be between the reservoir 102 and the combustor 108. The pressure regulator 120 may be configured to hold the reservoir 102 at a specified pressure setting. In some examples, the pressure regulator 120 may be in communication with a controller 164, wherein the controller 164 determines the pressure setting of the reservoir 102 from a signal received from a pressure sensor (not shown). The pressure setting may be preset or predetermined by a user input and/or the pressure setting may be determined by the controller 164 based on other characteristics of the system 100. The characteristics of the system 100 may be, for example, the mass of the fluid in the reservoir 102, the mass of the fluid in the tank 106, a target output of the load 104, a temperature of the load 104, and/or a maximum threshold temperature of the load 104. The pressure regulator 120 may be any device capable of regulating the pressure of the reservoir 102. The pressure regulator 120 may be, for example, a valve, such as an expansion valve, pressure reducing valve, or a flow control valve. Alternatively or additionally, the pressure regulator 120 may be an electronic controller.

The controller 164 may be any device that performs logic operations. The controller 550 may be in communication with a memory (not shown). The controller 550 may include a controller, engine control unit (ECU), engine control module (ECM), a general processor, a central processing unit, a computing device, an application specific integrated circuit (ASIC), a digital signal processor, a field programmable gate array (FPGA), a digital circuit, an analog circuit, a microcontroller, any other type of processor, or any combination thereof. The controller 164 may include one or more elements operable to execute computer executable instructions or computer code embodied in the memory.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

The combustor 108 may be a contained area where combustion takes place. The combustor 108 may also be referred to as a combustion chamber and/or a burner. The combustor 108 may be configured to combust the reactant 160 received from the tank 106 in the presence of the coolant 158 received from the reservoir 102. Alternatively or additionally, the combustor 108 may be configured to combust a mixture of the coolant 158 and the reactant 160 received from the reservoir 102 and the tank 106, respectively. In some examples, the reactant 160 from the tank 106 and/or the coolant 158 from the reservoir 102 that flows to the combustor 108 may be injected with a fuel and the fuel burned. The fuel may be any type of jet fuel or other fuel suitable for burning in the combustor 108. The combustor 108 may be configured to mix and ignite the coolant 158, the reactant 160, and/or the fuel. In some examples, the combustor 108 may include one or more fuel injectors, swirlers, and/or other components. The combustor 108 may include, for example, a can combustor, an annular combustor, a cannular combustor, or any other configuration of combustor.

Combustion products 162 are one or more fluids and/or solids that result from combustion of the fluids in the combustor 108. A flow of the combustion products 162 through the turbine 112 may drive the turbine 112. Alternatively the turbine 112 may be driven by flow of a mixture of the combustion products 162 and any non-combusted coolant 158. The combustion products 162 may be any gas, liquid, or mixture thereof that results from the combustion of the coolant 158, the reactant 160, and/or any other reactant. In one example where the reactants 160 are hydrogen and oxygen, one of the combustion products 162 resulting from the combustion of the hydrogen and oxygen may be steam. Other examples of the combustion products 162 may include hydrogen, oxygen, nitrogen, and nitrogen oxide gasses. Alternatively or additionally, the combustion products 162 may include a combination of any of the example combustion products 162 described herein that may combine to form heavier gases, for example, hydrocarbons.

The turbine 112 may be any device or machine configured to transfer kinetic energy of fluid into rotational energy. Alternatively or in addition, the turbine 112 may be any device that extracts energy from a continuously moving stream of fluid. The turbine 112 may include a rotor and one or more blades coupled to or integral to the rotor, where the rotor is configured to rotate if fluid, such as a gas, flows sufficiently fast past the one or more blades. The turbine 112 may be an axial flow machine, a radial flow machine, or any other design. The combination of the combustor 108 and the turbine 112 may be referred to as an engine. For example, the combustor 108 and the turbine 112 may be components of a gas turbine engine.

The turbine 112 may be mechanically coupled to the generator 114. The generator 114 may be any electric generator. The generator 114 may be any device able to convert motive power into electrical power. Examples of the generator 114 include a direct current (DC) generator and/or an alternating current (AC) generator. The generator 114 may be electrically coupled to the load 104, and the electricity generated by the generator 114 may be supplied to the load 104.

The capture plenum 116 may be coupled to an outlet 154 of the turbine 112 and may be configured to capture the combustion products 162 after the combustion products 162 flow past the blades of the turbine 112. The capture plenum 116 may be any device capable of collecting or capturing fluids. The capture plenum 116, for example, may be capable of capturing phase changing liquid and/or gases. The capture plenum 116 may be made of a flexible material such that the capture plenum 116 may expand and/or contract based on the volume of fluids contained by the capture plenum 116. For example, the capture plenum 116 may be made up of a multilayer flexible fabric structure which may include structural, thermal, pressure, and/or impact shielding that may utilize such materials as Mylar, Kevlar, and/or other commercially available solutions. The outer surface of the plenum may include flexible ribbed features to allow the plenum to inflate and/or deflate in a consistent manner and shape. The material of the capture plenum 116 may allow the capture plenum 116 to be self-contracting. An inlet 146 of the capture plenum 116 may include, for example, a valve, for example a check valve or a one way flow control valve, in order to prevent combustion products 162 from flowing back towards the turbine 112.

In the example shown in FIG. 1, the capture plenum 116 may be in thermal communication with the second heat exchanger 126. The second heat exchanger 126 may also be in thermal communication with the cooling source 118. The cooling source 118 may be any source of cooling able to cool the combustion products 162 captured by the capture plenum 116. The cooling source 118 may, for example, be the ambient atmosphere of the system 100 or the environment in which the system 100 is operating. For example, air outside of an aircraft. The environment in which the system 100 operates, for example, may have an ambient temperature below a corresponding dew point of the combustion products 162 collected in the capture plenum 116. The outlet 156 of the capture plenum 116 may be in fluid communication with the inlet 130 of the reservoir 102.

Additionally or alternatively, the pump 122 may be disposed on a fluid path between the capture plenum 116 and the reservoir 102, wherein an inlet 148 of the pump 122 is in fluid communication with the outlet 156 of the capture plenum 116, and an outlet 150 of the pump 122 is in fluid communication with the inlet 130 of the reservoir 102. The pump 122 may be configured to pump one or more of the cooled combustion products 162 from the capture plenum 116 to the reservoir 102. The pump 122 may include any device or combination of devices able to control a flow of the cooled combustion products 162 from the capture plenum 116 to the reservoir 102.

During operation of the system 100 shown in the example shown in FIG. 1, the coolant 158 contained in the reservoir 102 is used to cool the load 104. For example, the coolant 158 may flow from the reservoir 102 to the first heat exchanger 124, while the working fluid that is heated by the load 104 flows from the load 104 to the first heat exchanger 124. Within the first heat exchanger 124, heat may be transferred from the working fluid of the load 104 to the coolant 158 of the reservoir 102. The cooled working fluid may then flow back to an inlet 138 of the load 104, cooling the load 104. The heated coolant 158 may then flow back to an inlet 140 of the reservoir 102.

The coolant 158 in the reservoir 102 may resupply the tank 106. The reservoir 102 may feed the recharge device 110, which supplies the reactant 160 to the tank 106. In the example shown in FIG. 1, the coolant 158 may flow from the outlet 134 of the reservoir 102 to the inlet 136 of the recharge device 110. The recharge device 110 may cause a chemical reaction, wherein the coolant 158 or a mixture of the coolant 158 and an additional fluid undergo a chemical reaction and one or more reactants 160 are produced. In one example of the system 100 where the coolant 158 is ammonia, the recharge device 110 may convert the ammonia into hydrazine, wherein the recharge device 110 may contain hydrogen peroxide. For example, the coolant 158 may flow into the recharge device 110, chemically react with the hydrogen peroxide, and the reactant 160 may be the resulting hydrazine. Alternatively or additionally, the chemical reaction caused by the recharge device 110 may be part of an ammonia adsorption cycle. The electrical source 128 may power the recharge device 110 such that the recharge device 110, relatively slowly, trickle transforms the coolant 158 into one or more reactants 160. The one or more reactants 160 may then flow from an outlet 142 of the recharge device 110 to the inlet 144 of the respective tank 106.

Fluids from the tank 106 and the reservoir 102, respectively, flow to the combustor 108. The tank 106 and the reservoir 102 feed the reactant 160 and the coolant 158, respectively, to the combustor 108, which drives the turbine 112. A flow of combustion products 162 may flow from an outlet 152 of the combustor 108 and past blades of the turbine 112, thereby rotating the rotor in the turbine 112. The rotation of the rotor of the turbine 112 may mechanically power the generator 114. In other words, the turbine 112 may mechanically power the generator 114, which generates electricity to electrically power the load 104. The generator 114 may generate electrical energy from the mechanical power supplied by the turbine 112.

The combustion products 162 passing through the turbine 112 are captured by the capture plenum 116. The captured combustion products 162 may be cooled by the cooling source 118. The capture plenum 116 may expand, for example, as the combustion products 162 flow into the capture plenum 116 from the outlet 154 of the turbine 112. The captured combustion products 162 may be cooled and/or condensed by the second heat exchanger 126. Alternatively or in addition, the combustion products 162 may be cooled by the atmosphere via thermal radiation or radiative cooling, wherein the combustion products 162 condense as they are cooled to the ambient temperature. In one example, the system 100 may be used at an altitude of approximately 100 kilometers, or at the boundary of the Earth's atmosphere and outer space, and the relatively cold ambient temperature, as compared to the temperature of the combustion products 162 exhausted from the turbine 112, may cool the combustion products 162 through thermal radiation.

As the combustion products 162 are cooled and/or condensed by the second heat exchanger 126 and the cooling source 118, the capture plenum 116 may contract. The capture plenum 116 may contract as a result of the cooling. The capture plenum 116 may direct the cooled combustion products 162 to an outlet 156 of the capture plenum 116. The cooled combustion products 162 in the capture plenum 116 may flow from the capture plenum 116 into the reservoir 102, wherein the reservoir 102 is resupplied with the coolant 158 from the cooled combustion products 162. Contraction of the capture plenum 116 may force the cooled combustion products 162 to flow through the outlet 156 of the capture plenum 116 and to the inlet 130 of the reservoir 102. The material of the capture plenum 116 may be self-contracting and cause the capture plenum 116 to contract as a volume of the fluids contained by the capture plenum 116 decreases, for example, as the fluids are condensed from a gas to a liquid by the second heat exchanger 126. The pump 122 may force the cooled combustion products 162 in the capture plenum 116 to flow from the capture plenum 116 to the reservoir 102. Additionally, the pump 122 may provide suction to contract the capture plenum 116 as the combustion products 162 are cooled and/or as a volume of the fluids contained by the capture plenum 116 decreases.

Figure 2:
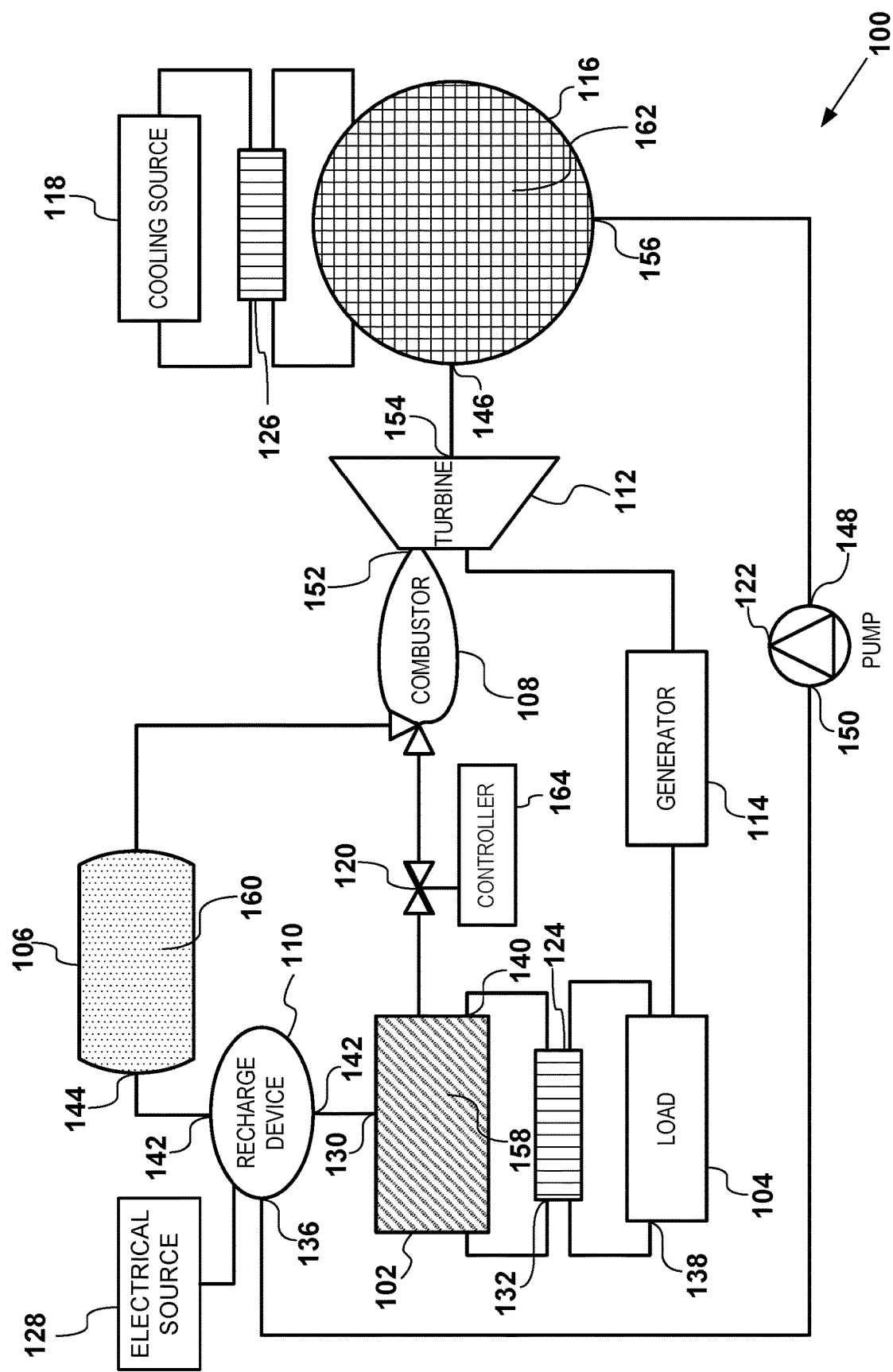
FIG. 2 is a schematic diagram of an example of a system in which a recharge device is in fluid communication with a capture plenum.

The system 100 may be implemented in many different ways. For example, FIG. 2 is a schematic diagram of an example of the system 100 in which the recharge device 110 is in fluid communication with the capture plenum 116. The outlet 156 of the capture plenum 116 and/or the outlet 150 of the pump 122 may be in fluid communication with the inlet 136 of the recharge device 110. The recharge device 110 may have one or more outlets 142, wherein a first one of the outlets 142 is in fluid communication with the inlet 130 of the reservoir 102 and/or a second one of the outlets 142 is in fluid communication with the inlet 144 of the tank 106.

In the example of the system 100 shown in FIG. 2, the coolant 158 contained in the reservoir 102 and/or the reactant 160 contained in the tank 106 may result from decomposition of the cooled combustion products 162. The coolant 158, for example, may be a second reactant. In one example where the combustion products 162 include a chemical composition of propane and water, the coolant 158 may be propane and/or the reactant 160 may be oxygen.

During operation of the system 100 shown in FIG. 2, the cooled combustion products 162 may flow from the outlet 156 of the capture plenum 116 to the inlet of the recharge device 110. Additionally, the pump 122 may pump the cooled combustion products 162 from the capture plenum 116 to the recharge device 110.

The recharge device 110 may decompose the cooled combustion products 162 into one or more fluids. The decomposed fluids may include, for example, the coolant 158 and the reactant 160. The decomposed coolant 158 may flow from an outlet 142 of the recharge device 110 to the reservoir 102 where the coolant 158 is used to cool the load 104 and/or supply the combustor 108. The reactant 160 may flow from another outlet 142 of the recharge device 110 to the inlet of the tank 106 where the reactant is used to supply the combustor 108.

Figure 3:
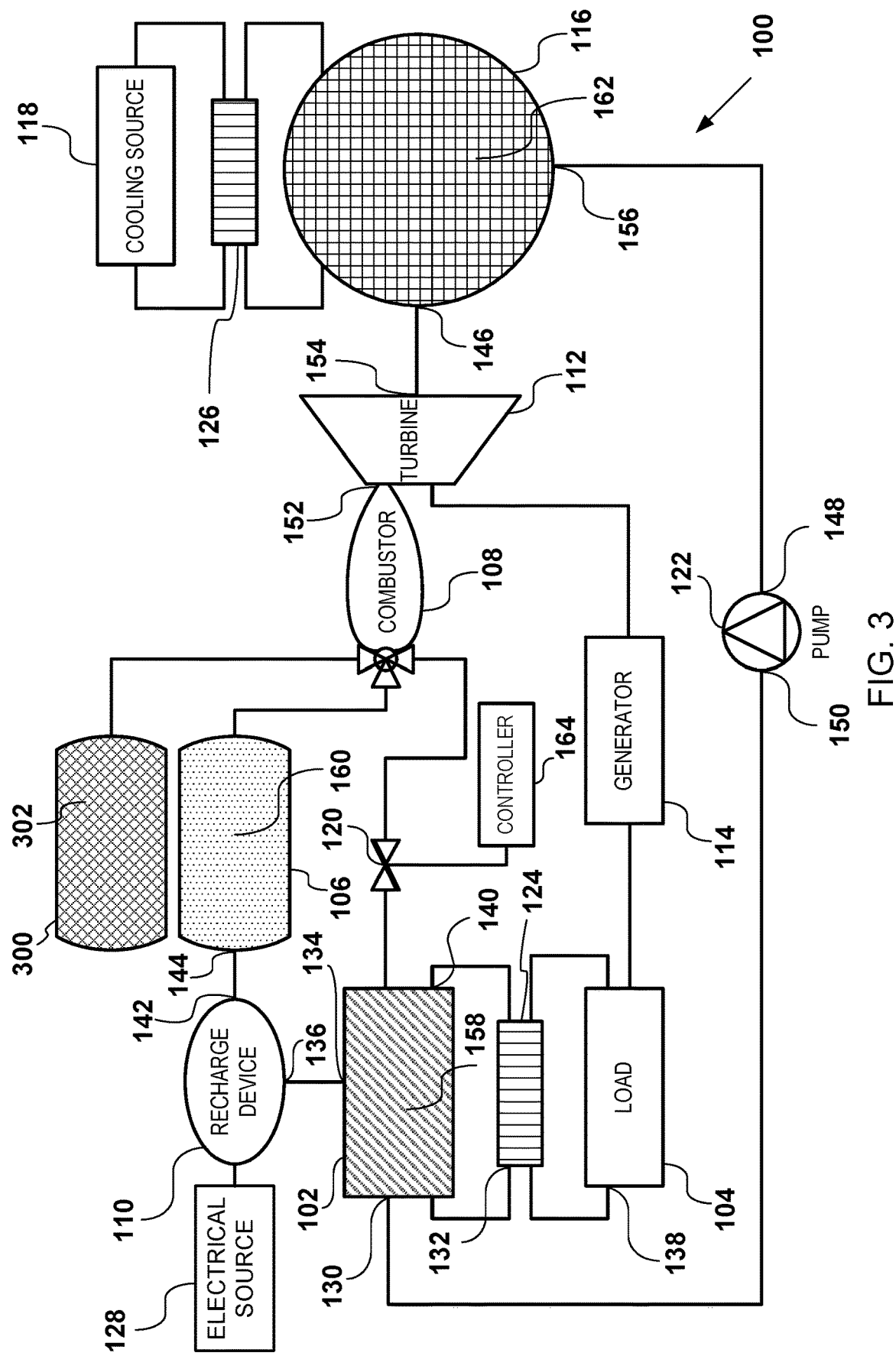
FIG. 3 is a schematic diagram of an example of a system, wherein the system includes a second tank.

FIG. 3 is a schematic diagram of an example of a system 100, wherein the system 100 includes a second tank 300. The second tank 300 may store a combustible fluid 302. The second tank 300 may be any vessel configured to hold or contain a fluid. The combustible fluid 302 in the second tank 300 may be a liquid, a gas, or a mixture thereof. The combustible fluid 302 in the second tank 300 may be a fluid that is difficult or unable to be removed from the coolant 158 by the recharge device 110. For example, when oxygen is not removable from the coolant 158 and/or the combustion products 162, the second tank 300 may contain oxygen. The second tank 300 may be pressurized, and the combustible fluid inside of the second tank 300 may be compressed. The second tank 300 may be in fluid communication with the combustor 108.

During operation of the system 100 shown in FIG. 3, fluids from the tank 106, the second tank 300, and the reservoir 102 flow to the combustor 108. The second tank 300 may feed the combustible fluid 302 to the combustor 108. The tank 106, the second tank 300, and the reservoir 102 may feed the reactant 160, the combustible fluid 302, and the coolant 158, respectively, to the combustor 108, which drives the turbine 112. The second tank 300 may be replaced and/or the second tank 300 may be re-filled with combustible fluid 302 from an external source, such as refueling truck or an air-based tanker outside of the system 100.

Figure 4:
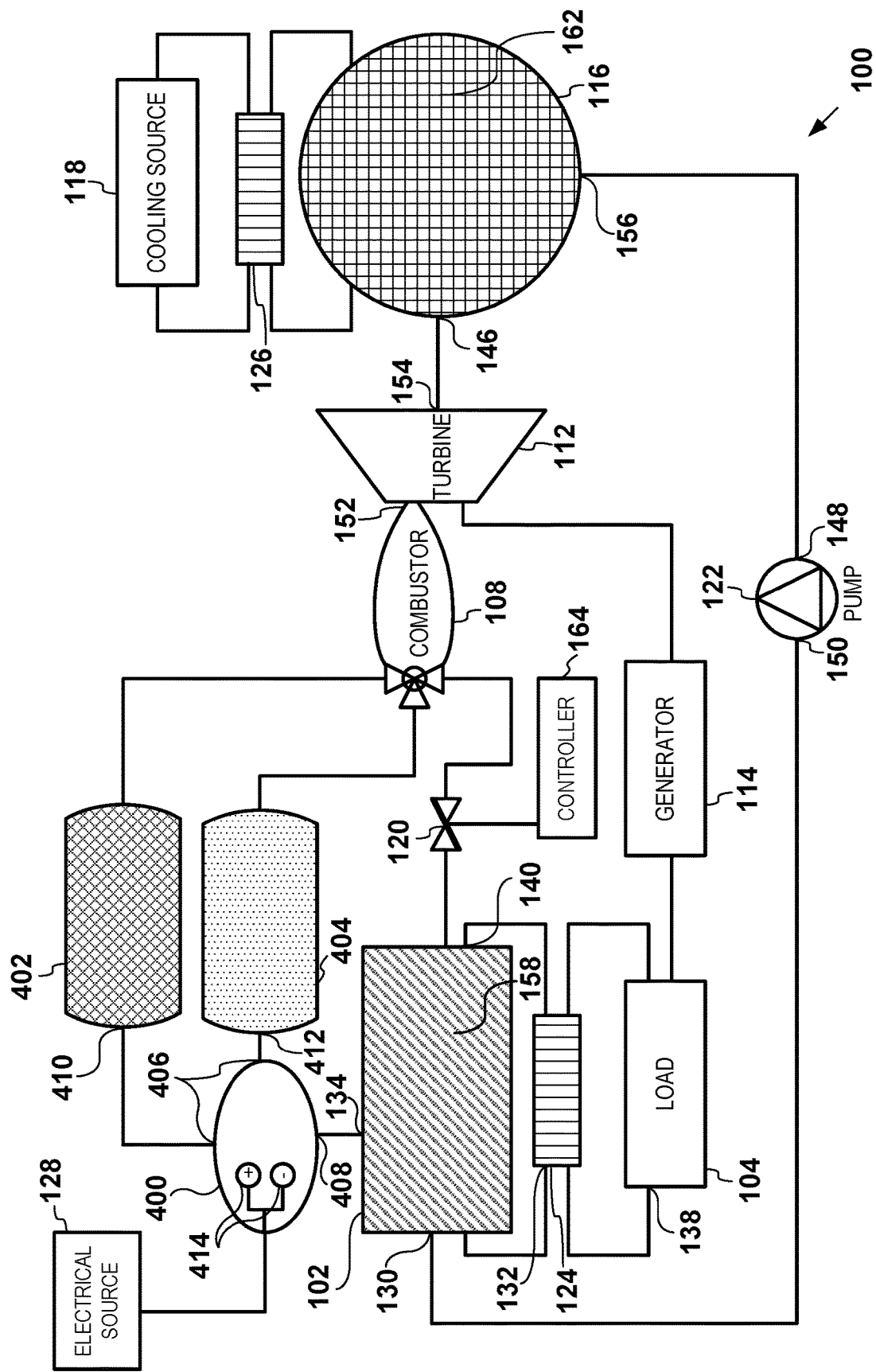
FIG. 4 is a schematic diagram of an example of a system in which a recharge device is an electrolysis machine, and the system includes an oxygen tank and a hydrogen tank.

FIG. 4 is a schematic diagram of an example of the system 100 in which the recharge device 110 is an electrolysis machine 400, and wherein the system 100 includes an oxygen tank 402 and a hydrogen tank 404. The electrolysis machine 400 may have an inlet 408 in fluid communication with the reservoir 102. The electrolysis machine 400 may have one or more outlets 406, where in one outlet 406 is in fluid communication with an inlet 410 of the oxygen tank 402 and another outlet 406 is in fluid communication with an inlet 412 of the hydrogen tank 404. In the electrolysis machine 400, two or more electrodes 414, such as a cathode and an anode, are immersed in a fluid, such as the coolant 158. The electrodes 414 are connected to the electrical source 128. Alternatively, the electrolysis machine 400 may be integrated with the reservoir 102 so the electrodes 414 are immersed in the coolant 158 inside of the reservoir 102.

During a power mode of the system 100 shown in FIG. 4, fluids from the oxygen tank 402, the hydrogen tank 404, and the reservoir 102 flow to the combustor 108. The oxygen tank 402, the hydrogen tank 404, and/or the reservoir 102 may feed oxygen, hydrogen, and/or water, respectively, to the combustor 108, which drives the turbine 112. The combustor 108 may combust a mixture of the hydrogen and the oxygen, supplied by hydrogen tank 404 and the oxygen tank 402, respectively, in the presence of the water supplied by the reservoir 102. The combustion products 162 are collected by the capture plenum 116 from the outlet 154 of the turbine 112.

During a recharge mode of the system 100 shown in FIG. 4, the electrolysis machine 400 may carry ions from one of the electrodes 414 to another. The coolant 158, such as water, may flow from the reservoir 102 to the electrolysis machine 400 and past the electrodes 414 such that the electrodes 414 are immersed in the coolant 158. The coolant 158 may undergo an oxidation reaction at one of the electrodes 414, for example, at the anode, in which the anode removes electrons from the coolant 158. At another electrode 414, for example, at the cathode, the coolant 158 may undergo a reduction reaction, in which the electrons removed by the anode are carried to the cathode and added to the coolant 158 at the cathode. The resulting reactants 160 produced at the cathode and anode, such as hydrogen and oxygen, respectively, may flow to the inlets of respective tanks 402 and 404.

The combustion products 162 collected by the capture plenum 116 from the outlet 154 of the turbine 112 include steam and/or liquid water. The second heat exchanger 126 may cool and/or condense the steam into water. The capture plenum 116 and/or pump 122 may then cause the cooled water to flow from the capture plenum 116 to the reservoir 102. The oxygen tank 402 and the hydrogen tank 404 may then be resupplied from the water via the electrolysis machine 400. Additionally, the water from the reservoir may be used to cool the load 104 via the first heat exchanger 124.

Each component may include additional, different, or fewer components than shown in the examples illustrated in FIGS. 1-4. For example, the system 100 may include additional tanks 106, 300, wherein the tanks hold additional reactants 160 and/or combustible fluids 302. Additionally or alternatively, the system 100 may include pressure regulators between any of the system components, for example, between the tank 106, 300 and the combustor 108. Alternatively, or in addition, the controller 164 may be in communication with and/or control additional components. For example, the controller 164 may control the pump 122 capture plenum 116, and/or recharge device 110 in order to regulate the recharging of the reservoir 102 and/or tank 106 from the combustion products 162.

Figure 5:
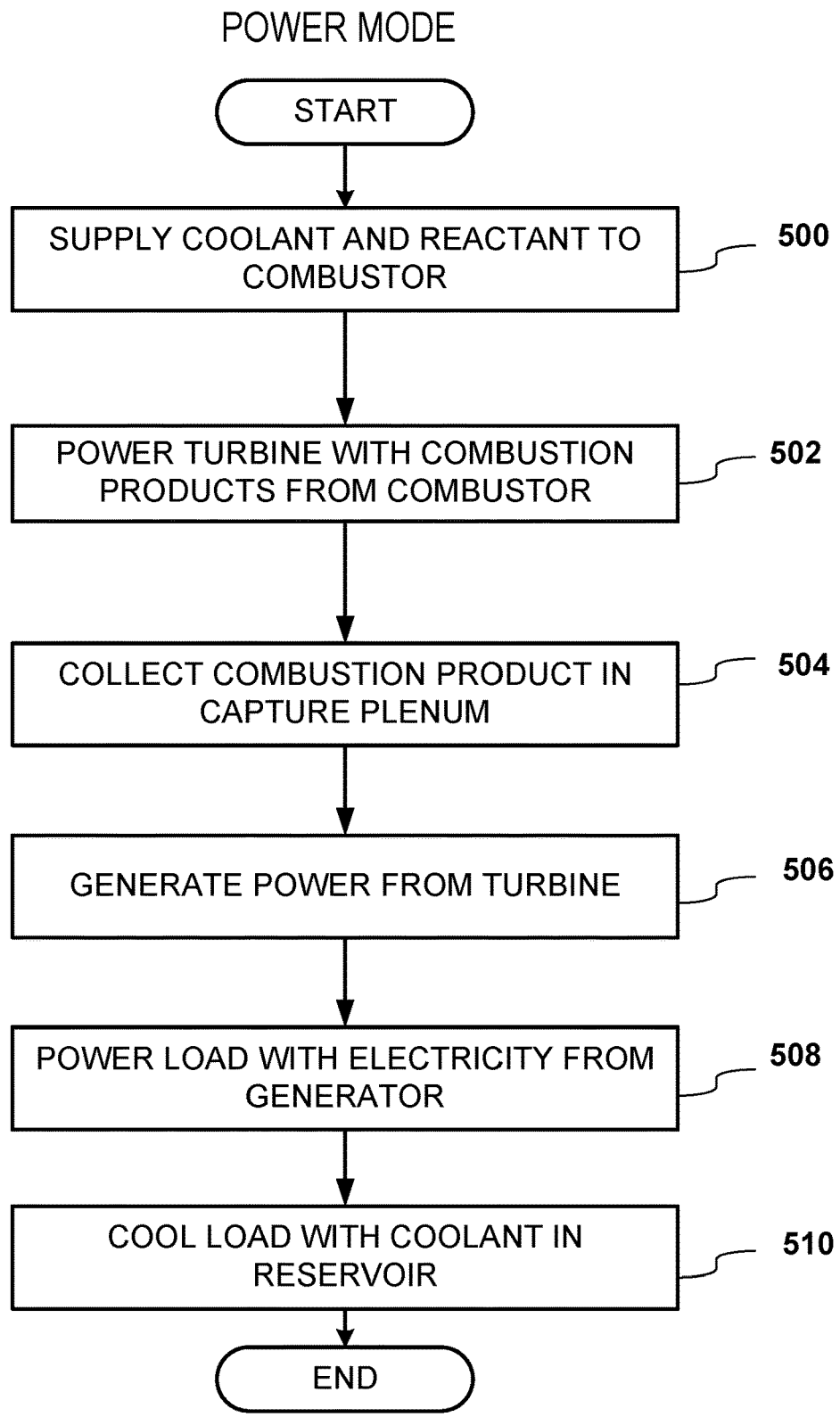
FIG. 5 illustrates a flow diagram of example steps for a power mode of a system, wherein the power mode provides power and thermal management.

FIG. 5 illustrates a flow diagram of example steps for a power mode of the system 100, wherein the power mode provides power and thermal management. The steps may include additional, different, or fewer steps than illustrated in FIG. 5. The steps may be executed in a different order than illustrated in FIG. 5.

The coolant 158 and/or the reactant 160 may be released from the reservoir 102 and/or tank 106, respectively, and supplied (500) to the combustor 108. For example the coolant 158 may flow from the reservoir 102, through the pressure regulator 120, and into the combustor 108.

The combustor 108 may ignite and combust the coolant 158, the reactant 160, and/or a fuel. The combustion products 162 resulting from combustion of the coolant 158 and/or reactant 160 may flow from the combustor 108 to the turbine 112. The flow of combustion products 162 over the blades of the turbine 112 may power (502) the turbine 112 and cause the rotor of the turbine to rotate, wherein the rotor is coupled to the blades of the turbine 112.

The combustion products 162 may flow from the outlet 154 of the turbine 112 to the inlet 146 of the capture plenum 116. The capture plenum 116 may collect (504) and/or contain the combustion products 162.

The rotor of the turbine 112 may be coupled to the generator 114. The rotation of the rotor may drive the generator 114. The generator 114 may use the mechanical rotation from the rotor to generate power (506), for example electricity.

The generator 114 may be in electrical communication with the load 104. The electricity generated by the generator 114 may be used to power (508) the load 104.

The reservoir 102 may be in thermal communication with the first heat exchanger 124. The coolant 158 may flow from the reservoir 102 and through the first heat exchanger 124. The coolant 158 may be used to cool (510) the load 104. The first heat exchanger 124 may transfer heat generated by the load 104 from the working fluid of the load 104 to the coolant 158. The steps illustrated in FIG. 5 may be performed in parallel as the load 104 is continuously powered and cooled by the system 100.

Figure 6:
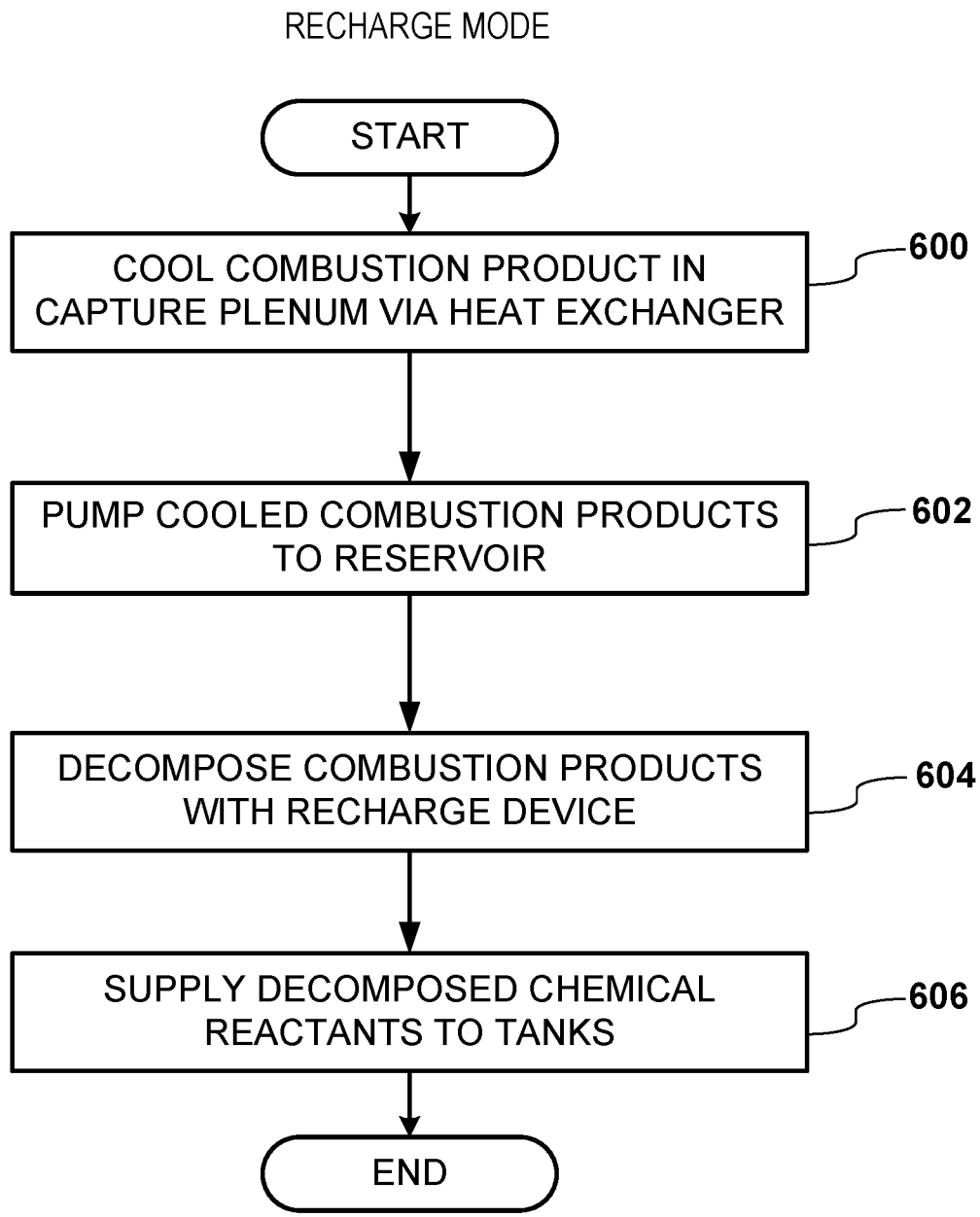
FIG. 6 illustrates a flow diagram for a recharge mode, wherein the recharge mode recycles and/or resupplies fluids used for power and thermal management.

FIG. 6 illustrates a flow diagram for a recharge mode, wherein the recharge mode recycles and/or resupplies fluids used for power and thermal management. The steps may include additional, different, or fewer steps than illustrated in FIG. 6. The steps may be executed in a different order than illustrated in FIG. 6.

The second heat exchanger 126 may cool (600) the combustion products 162 captured in the capture plenum 116. The combustion products 162 may be cooled through radiation cooling, wherein the cooling source 118 cools the combustion products 162 via the second heat exchanger 126. The combustion products 162 may condense into a liquid as they are cooled.

The pump 122 may pump (602) the cooled combustion products 162 from the capture plenum 116 to the reservoir 102, wherein the outlet 156 of the capture plenum is in fluid communication with the inlet of the pump 122 and the outlet 150 of the pump is in fluid communication with the inlet 130 of the reservoir 102.

The reservoir 102 may be refilled from the combustion products 162 pumped from the capture plenum 116. The coolant 158 from the refilled reservoir 102 may be decomposed (604) by the recharge device 110.

The recharge device 110 may decompose (604) the coolant 158 into the one or more reactants 160 through a chemical reaction. The reactants 160 may be supplied (606) to respective tanks 106 from the recharge device 110. The steps illustrated in FIG. 6 may be performed in parallel as the second heat exchanger 126 may continuously cool and/or condense combustion products 162 in the capture plenum 116.

Figure 7:
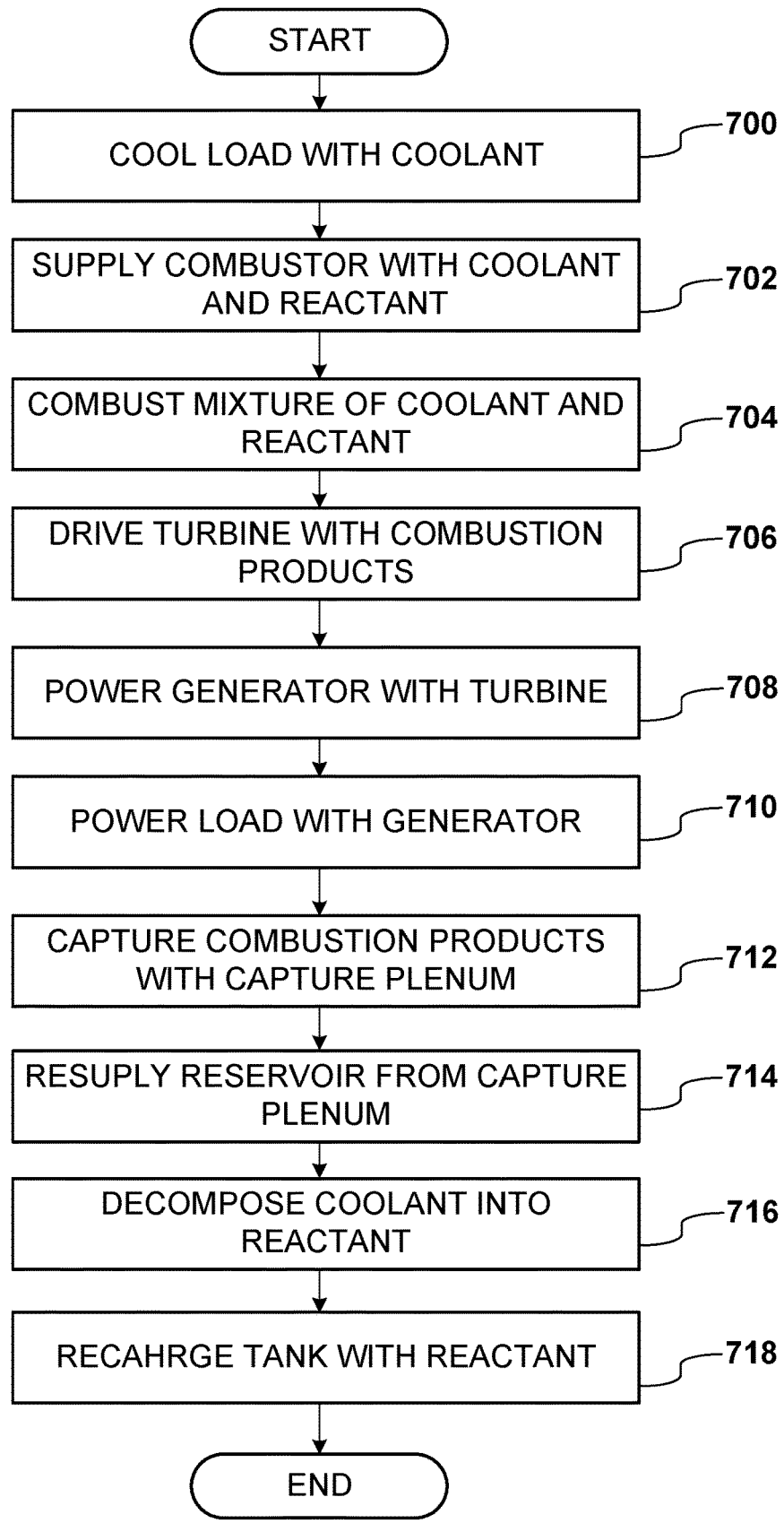
FIG. 7 illustrates a flow diagram of example steps for providing power and thermal management and resupplying fluids used for power and thermal management.

FIG. 7 illustrates a flow diagram of example steps for providing power and thermal management and resupplying fluids used for power and thermal management. The steps may include additional, different, or fewer steps than illustrated in FIG. 7. The steps may be executed in a different order than illustrated in FIG. 7.

The load 104 may be cooled (700) with the coolant 158 via the first heat exchanger 124, wherein the coolant 158 is stored in the reservoir 102. The first heat exchanger 124 may be in thermal communication with the reservoir 102 and the load 104.

The combustor 108 may be supplied (702) with the coolant 158 and the reactant 160, and combust (704) a mixture of the coolant 158 and the reactant 160. Alternatively or additionally, the combustor 108 may combust (704) the reactant 160 in the presence of the coolant 158, wherein the reactant 160 is stored in the tank 106.

The combustion products 162 may drive (706) the turbine 112 with a flow of the combustion products 162 from the combustor 108. The turbine 112 may power (708) the electric generator 114, and the electricity generated by the generator 114 may power (710) the load 104.

The capture plenum 116 may capture (712) the combustion products 162 that flow from the outlet 154 of the turbine 112. The combustion products 162 captured by the capture plenum 116 may resupply (714) the reservoir 102.

The coolant 158 may flow from the reservoir 102 to the recharge device 110. The recharge device 110 may decompose (716) the coolant 158 into the reactant 160. The recharge device 110 may recharge (718) the tank 106 with the reactant 160 decomposed from the coolant 158. The steps illustrated in FIG. 7 may be performed in parallel as the load 104 is continuously powered and cooled by the system 100.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a power and thermal management system comprising: a reservoir configured to store a coolant; a heat exchanger in thermal communication with the reservoir, the heat exchanger configured to transfer heat from a load to the coolant; a tank configured to store a reactant; a combustor in fluid communication with the reservoir and the tank, wherein the combustor is configured to combust a mixture of the coolant and the reactant or combust the reactant in the presence of the coolant supplied by the reservoir; a turbine configured to be driven by a flow of a plurality of combustion products from the combustor; an electric generator configured to be mechanically powered by the turbine, the electric generator configured to electrically power the load; a capture plenum configured to collect the combustion products from the turbine, the capture plenum in fluid communication with the reservoir, the capture plenum further configured to resupply the reservoir from the combustion products; and a recharge device in fluid communication with the reservoir, wherein the recharge device is configured to decompose the coolant in the reservoir and recharge the tank from the decomposed coolant.

A second aspect relates to the system of aspect 1, wherein the tank is a first tank and wherein the system further comprises a second tank configured to store a combustible fluid.

A third aspect relates to the system of any preceding aspect, wherein the system further includes a pump in fluid communication with the capture plenum and the reservoir, wherein the pump is configured to pump the combustion products from the capture plenum to the reservoir.

A fourth aspect relates to the system of any preceding aspect, wherein the tank is a first tank and the reactant is a first reactant, wherein the system further includes a second tank configured to store a second reactant and wherein the second reactant is recharged from decomposed coolant.

A fifth aspect relates to the system of any preceding aspect, wherein the recharge device comprises a water electrolysis machine.

A sixth aspect relates to the system of any preceding aspect, wherein the recharge device is configure to convert the coolant to the reactant in the presence of a catalyst.

A seventh aspect relates to the system of any preceding aspect, wherein the tank is a first tank, and wherein the system further comprises a second tank configured to hold oxygen.

An eighth aspect relates to the system of any preceding aspect, wherein the capture plenum is configured to expand and contract.

An ninth aspect relates to a method of providing power and thermal management, the method comprising: cooling a load with a coolant via a heat exchanger, wherein the coolant is stored in a reservoir, the heat exchanger in thermal communication with the reservoir and the load; supplying a combustor with the coolant and a reactant, and combusting a mixture of the coolant and the reactant or combusting the reactant in the presence of the coolant, wherein the reactant is stored in a tank; driving a turbine with a flow of a plurality of combustion products from the combustor; powering an electric generator with the turbine; powering the load with electricity generated by the electric generator; capturing the combustion products in a capture plenum; resupplying the reservoir from the combustion products collected by the capture plenum; decomposing the coolant into the reactant; and recharging the tank from the reactant decomposed from the coolant.

A tenth aspect relates to the method of aspect 9, wherein the heat exchanger is a first heat exchanger, and wherein the method further comprising cooling the combustion products via a second heat exchanger.

An eleventh aspect relates to the method of any preceding aspect, wherein the second heat exchanger cools the combustion products by radiation cooling.

A twelfth aspect relates to the method of any preceding aspect, wherein the second heat exchanger is included within the capture plenum.

A thirteenth aspect relates to the method of any preceding aspect, wherein the recharge device is powered with electricity provided by solar panels.

A fourteenth aspect relates to the method of any preceding aspect, wherein the recharge device is powered with electricity provided by an electric battery.

A fifteenth aspect relates to a power and thermal management system comprising: a reservoir configured to store water; a heat exchanger in thermal communication with the reservoir, the heat exchanger configured to cool a load with the water stored in the reservoir; a first tank configured to store hydrogen; a second tank configured to store oxygen; a combustor in fluid connection with the reservoir, the first tank, and the second tank, wherein the combustor is configured to combust a mixture of the hydrogen supplied by the first tank and the oxygen supplied by the second tank in the presence of the water supplied by the reservoir; a turbine configured to be driven by a flow of a plurality of combustion products from the combustor; a generator configured to be mechanically powered by the turbine, the generator configured to electrically power the load; a capture plenum configured to collect the combustion products from the turbine, which include captured water, the capture plenum further configured to resupply the reservoir with the captured water; a water electrolysis machine configured to decompose the water supplied by the reservoir into hydrogen and oxygen wherein the water electrolysis machine is further configured to recharge the first tank and the second tank with the hydrogen and the oxygen, respectively, obtained from the decomposed water.

A sixteenth aspect relates to the system of aspect 15, wherein the system further includes a power mode of operation and a recharge mode of operation.

A seventeenth aspect relates to the system of any preceding aspect, wherein the system further comprises a pressure regulator coupled to the reservoir.

An eighteenth aspect relates to the system of any preceding aspect, wherein the pressure regulator comprises a valve.

A nineteenth aspect relates to the system of any preceding aspect, wherein the pressure regulator comprises an electronic controller.

In addition to the features mentioned in each of the independent aspects enumerated above, some examples may show, alone or in combination, the optional features mentioned in the dependent aspects and/or as disclosed in the description above and shown in the figures.

What is claimed is:

1. A power and thermal management system comprising:
   a reservoir configured to store a coolant;
   a heat exchanger in thermal communication with the reservoir, the heat exchanger configured to transfer heat from a load to the coolant;
   a tank configured to store a reactant;
   a combustor in fluid communication with the reservoir and the tank, wherein the combustor is configured to combust a mixture of the coolant and the reactant or combust the reactant in the presence of the coolant supplied by the reservoir;
   a turbine configured to be driven by a flow of a plurality of combustion products from the combustor;
   an electric generator configured to be mechanically powered by the turbine, the electric generator configured to electrically power the load;
   a capture plenum configured to collect the combustion products from the turbine, the capture plenum in fluid communication with the reservoir, the capture plenum further configured to resupply the reservoir from the combustion products; and
   a recharge device in fluid communication with the reservoir, wherein the recharge device is configured to decompose the coolant in the reservoir and recharge the tank from the decomposed coolant.

2. The system of claim 1, wherein the tank is a first tank and wherein the system further comprises a second tank configured to store a combustible fluid.

3. The system of claim 1, wherein the system further includes a pump in fluid communication with the capture plenum and the reservoir, wherein the pump is configured to pump the combustion products from the capture plenum to the reservoir.

4. The system of claim 1, wherein the tank is a first tank and the reactant is a first reactant, wherein the system further includes a second tank configured to store a second reactant and wherein the second reactant is recharged from decomposed coolant.

5. The system of claim 1, wherein the recharge device comprises a water electrolysis machine.

6. The system of claim 1, wherein the recharge device is configure to convert the coolant to the reactant in the presence of a catalyst.

7. The system of claim 1, wherein the tank is a first tank, and wherein the system further comprises a second tank configured to hold oxygen.

8. The system of claim 1, wherein the capture plenum is configured to expand and contract.

9. A method of providing power and thermal management, the method comprising:
   cooling a load with a coolant via a heat exchanger, wherein the coolant is stored in a reservoir, the heat exchanger in thermal communication with the reservoir and the load;
   supplying a combustor with the coolant and a reactant, and combusting a mixture of the coolant and the reactant or combusting the reactant in the presence of the coolant, wherein the reactant is stored in a tank;

driving a turbine with a flow of a plurality of combustion products from the combustor;
powering an electric generator with the turbine;
powering the load with electricity generated by the electric generator;
capturing the combustion products in a capture plenum;
resupplying the reservoir from the combustion products collected by the capture plenum;
decomposing the coolant into the reactant; and
recharging the tank from the reactant decomposed from the coolant.

10. The method of claim 9, wherein the heat exchanger is a first heat exchanger, and wherein the method further comprising cooling the combustion products via a second heat exchanger.

11. The method of claim 10, wherein the second heat exchanger cools the combustion products by radiation cooling.

12. The method of claim 10, wherein the second heat exchanger is included within the capture plenum.

13. The method of claim 9, wherein the recharge device is powered with electricity provided by solar panels.

14. The method of claim 9, wherein the recharge device is powered with electricity provided by an electric battery.

15. A power and thermal management system comprising:
a reservoir configured to store water;
a heat exchanger in thermal communication with the reservoir, the heat exchanger configured to cool a load with the water stored in the reservoir;
a first tank configured to store hydrogen;
a second tank configured to store oxygen;
a combustor in fluid connection with the reservoir, the first tank, and the second tank, wherein the combustor is configured to combust a mixture of the hydrogen supplied by the first tank and the oxygen supplied by the second tank in the presence of the water supplied by the reservoir;
a turbine configured to be driven by a flow of a plurality of combustion products from the combustor;
a generator configured to be mechanically powered by the turbine, the generator configured to electrically power the load;
a capture plenum configured to collect the combustion products from the turbine, which include captured water, the capture plenum further configured to resupply the reservoir with the captured water;
a water electrolysis machine configured to decompose the water supplied by the reservoir into hydrogen and oxygen wherein the water electrolysis machine is further configured to recharge the first tank and the second tank with the hydrogen and the oxygen, respectively, obtained from the decomposed water.

16. The system of claim 15, wherein the system further includes a power mode of operation and a recharge mode of operation.

17. The system of claim 15, wherein the system further comprises a pressure regulator coupled to the reservoir.

18. The system of claim 17, wherein the pressure regulator comprises a valve.

19. The system of claim 17, wherein the pressure regulator comprises an electronic controller.

* * * * *